US008682032B2

(12) United States Patent
Fan et al.

(10) Patent No.: US 8,682,032 B2
(45) Date of Patent: Mar. 25, 2014

(54) EVENT DETECTION THROUGH PATTERN DISCOVERY

(75) Inventors: Quanfu Fan, Somerville, MA (US); Prasad Gabbur, Sleepy Hollow, NY (US); Sachiko Miyazawa, Bronx, NY (US); Jiyan Pan, Pittsburgh, PA (US); Sharathchandra U. Pankanti, Darien, CT (US); Hoang Trinh, Mt. Vernon, NY (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 13/213,262

(22) Filed: Aug. 19, 2011

(65) Prior Publication Data

US 2013/0044942 A1 Feb. 21, 2013

(51) Int. Cl.
*G06K 9/62* (2006.01)

(52) U.S. Cl.
USPC ............................ 382/103; 382/107; 382/190

(58) Field of Classification Search
None
See application file for complete search history.

(56) References Cited

U.S. PATENT DOCUMENTS

| 7,925,536 | B2 | 4/2011 | Lipton et al. |
| 2005/0102183 | A1 | 5/2005 | Kelliher et al. |
| 2006/0243798 | A1 | 11/2006 | Kundu et al. |
| 2007/0058040 | A1* | 3/2007 | Zhang et al. .................. 348/150 |
| 2010/0059589 | A1 | 3/2010 | Goncalves et al. |
| 2010/0134625 | A1* | 6/2010 | Bobbitt et al. ................. 348/150 |
| 2010/0135528 | A1* | 6/2010 | Bobbitt et al. ................. 382/103 |
| 2010/0166324 | A1 | 7/2010 | Kundu et al. |
| 2011/0270830 | A1* | 11/2011 | Stefik et al. .................... 707/731 |

FOREIGN PATENT DOCUMENTS

CN 100504916 6/2009

OTHER PUBLICATIONS

Quanfu Fan et al, Detecting Sweethearting in Retail Surveillance Videos, GOOGLE/IEEE/INSPEC, 2009, 4pp.
ACM DL Digital Library, Abstract of Gabbur et al, A Pattern Discovery Approach to Retail Fraud Detection, Proceeding KDD '11, Proceedings of the 17th ACM, New York, NY, 2011.

* cited by examiner

*Primary Examiner* — Brian P Werner
(74) *Attorney, Agent, or Firm* — Patrick J. Daugherty; Driggs, Hogg, Daugherty & Del Zoppo Co., LPA (57) ABSTRACT

Events are classified through string pattern recognition. Text labels are assigned to image primitives in a time-ordered set of training images and to related time-ordered transactions in an associated training transaction log in a combined time-ordered training string of text labels as a function of image types. Transactions are labeled in a training transaction log with a transaction label, a training primitive image of a start of a transaction with a start image text label, a training primitive of an entry of a transaction into the log with an entry image text label, and a training primitive of a conclusion of a transaction with an ending image text label. Positive subset string patterns are discovered representing true events from the combined time-ordered training string of text labels, and negative subset string patterns defined by removing single transaction primitive labels from the positive subset string patterns.

25 Claims, 3 Drawing Sheets

EVENT DETECTION THROUGH PATTERN DISCOVERY

BACKGROUND

The present invention relates to the analysis of human activities and, in one aspect, to accurately determining and distinguishing behaviors represented in videos.

In a variety of contexts there may be a desire to monitor human activities for the occurrence or omission of certain activities, for example to comply with activity processes and policies. Compliance failures may result in injuries from failure to observe safety regulations or physical barriers, theft in business and retail establishments and other losses or loss exposures. Gaps in procedure may be identified for remedy, for example through retraining, by capturing and recording behavior deviations with video systems for subsequent or contemporaneous analysis. However, human review and analysis of video feeds is time consuming and perhaps inefficient with respect to human resources allocations and, accordingly, it is desirable to implement automated systems for video analysis. Automated analysis of videos for determining human activities and behaviors presents a number of challenges, including providing for desired levels of accuracy in determinations of occurrences of human activities of concern, which must be recognized and sometimes distinguished from other activities, and wherein false alerts and missed event recognitions must occur at an acceptable level.

BRIEF SUMMARY

In one embodiment of the present invention, a method for classifying events through string pattern recognition includes assigning text labels to image primitives in a time-ordered set of training images and to related time-ordered transactions in an associated training transaction log in a combined time-ordered training string of text labels as a function of image types. The assigning includes labeling a transaction in the associated training transaction log with a transaction label, a training primitive image of a start of a transaction with a start image text label, a training primitive of an entry of a transaction into the log with an entry image text label, and a training primitive of a conclusion of a transaction with an ending image text label. Thus, a processing unit discovers positive subset string patterns representing true events from the combined time-ordered training string of text labels that are each repeated in at least two of the positive subset string patterns, start with a start image label, end with an ending image label, and comprise a single transaction primitive label. Negative subset string patterns are defined by removing the single transaction primitive label from each of the positive subset string patterns.

In another embodiment, a system has a processing unit, computer readable memory and a computer readable storage medium device with program instructions, wherein the processing unit, when executing the stored program instructions, assigns text labels to image primitives in a time-ordered set of training images and to related time-ordered transactions in an associated training transaction log in a combined time-ordered training string of text labels as a function of image types. Assigning includes labeling a transaction in the associated training transaction log with a transaction label, a training primitive image of a start of a transaction with a start image text label, a training primitive of an entry of a transaction into the log with an entry image text label, and a training primitive of a conclusion of a transaction with an ending image text label. Thus, the processing unit discovers positive subset string patterns representing true events from the combined time-ordered training string of text labels that are each repeated in at least two of the positive subset string patterns, start with a start image label, end with an ending image label, and comprise a single transaction primitive label. Negative subset string patterns are defined by removing the single transaction primitive label from each of the positive subset string patterns.

In another embodiment, an article of manufacture has a computer readable storage medium device with computer readable program code embodied therewith, the computer readable program code comprising instructions that, when executed by a computer processor, cause the computer processor to assign text labels to image primitives in a time-ordered set of training images and to related time-ordered transactions in an associated training transaction log in a combined time-ordered training string of text labels as a function of image types. Assigning includes labeling a transaction in the associated training transaction log with a transaction label, a training primitive image of a start of a transaction with a start image text label, a training primitive of an entry of a transaction into the log with an entry image text label, and a training primitive of a conclusion of a transaction with an ending image text label. Thus, positive subset string patterns representing true events are discovered from the combined time-ordered training string of text labels that are each repeated in at least two of the positive subset string patterns, start with a start image label, end with an ending image label, and comprise a single transaction primitive label. Negative subset string patterns are defined by removing the single transaction primitive label from each of the positive subset string patterns.

In another embodiment, a method for providing a service for classifying events through string pattern recognition includes providing one or more articles, including a string text labeler device that assigns text labels to image primitives in a time-ordered set of images and to related time-ordered transactions in an associated training log in a combined time-ordered string of text labels as a function of image types. A pattern discoverer device discovers positive subset string patterns representing true events from the combined time-ordered string of text labels that are each repeated in at least two of the positive subset strings, start with a start image label, end with an ending image label, and comprise a single transaction primitive label, and that defines a plurality of negative subset string patterns by removing the single transaction primitive label from each of the plurality of positive subset string patterns.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Historically, compliance of human activity with policies, regulations, etc. has typically been enforced through direct human surveillance. For example, safety and security personnel may watch cameras trained on certain areas to discover deviations from safety policies, trespassing, theft, unauthorized access to restricted areas, etc. However, human visual attention may be ineffective, particularly for large volumes of video data. Due to many factors, illustratively including an infrequency of activities of interest, a fundamental tedium associated with the task and poor reliability in object tracking in environments with visual clutter and other distractions, human video surveillance may be both expensive and ineffective.

Automated video surveillance systems and methods are known wherein computers or other programmable devices directly analyze video data and attempt to determine the occurrence of activities of concern. However, object tracking by prior art automated video surveillance systems and methods systems is often not reliable in a realistic, real-world environment and applications due to clutter, poor or variable lighting and object resolutions and distracting competing visual information.

A major source of retail loss is intentional or unintentional failure of proper checking out of items at the point of sale (POS). Sweet-hearting or "fake scanning" describes the action of a cashier in intentionally failing to scan or otherwise enter an item into a retail transaction in order to provide the merchandise free of charge for a customer presenting the items for purchase, usually by moving the item from an input (pick-up) location through the processing (scan) area and into the output (drop or bagging) area by covering up the item bar code, stacking an item on top of another to occlude the scanner from reading the code or passing the item around the scan area during a scan motion to intentionally avoid a bar code reader in the scan area with respect to a bar code of the free item.

In order to minimize such losses, automated visual compliance systems may be deployed for monitoring of checkout lanes for detecting non-compliant transactions, which employ various techniques for analyzing video streams along with Point-Of-Sale (POS) data. Many of these systems assume checkouts as being comprised of discrete visual events following a temporal order. Some methods model a checkout event as comprising three sub-event or primitive images: Pickup (P), Scan (S), and Drop (D) images that occur in that temporal order and which correspond to an item being picked up from a pickup area, passed through a barcode scanner and then dropped off on to a drop area.

Figure 1:
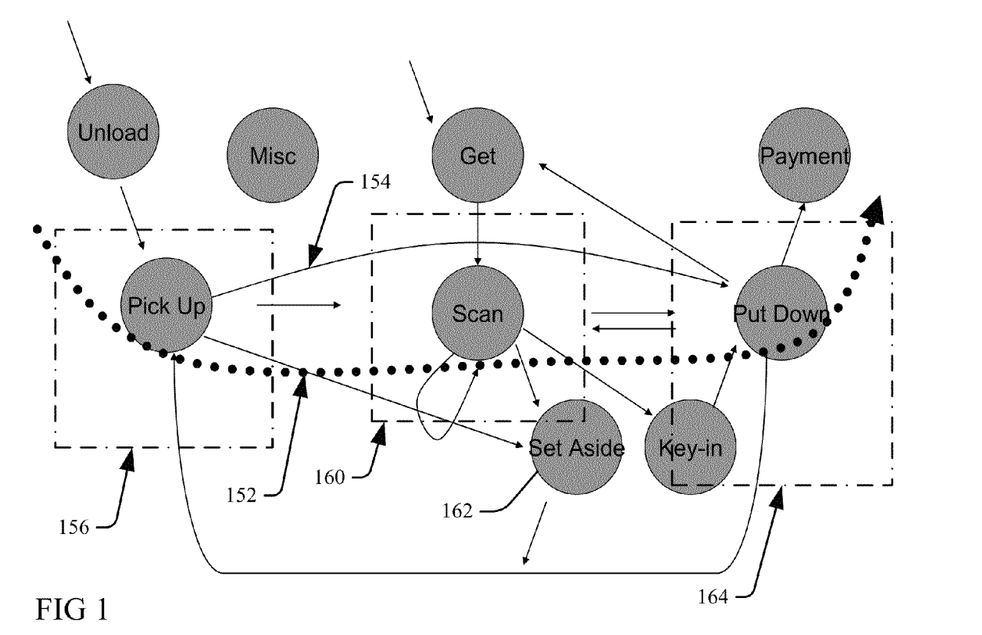
FIG. 1 illustrates an overhead perspective state diagram of possible human movements relative to scanning transactions according to the present invention.

For example, FIG. 1 is an overhead perspective state diagram of a plurality of possible movements and actions 162 of a cashier in a retail context (for example, of a scanning lane) with respect to possible movement vectors 152, 154. (It will be understood that as used herein "cashier" is a generic term to denote a person scanning an item, and that embodiments contemplate that the scanning person may be a clerk or cashier as well as a customer, bagger, manager or other person.) In a simple scanning motion path vector 152, an item is picked-up from a pick-up area 156, scanned by passing the item within scanning range of a scanner in a scanning area 160 and then put down in a bagging or drop area 164. Examples of the pick-up areas 156 include an intake belt, a counter, a shopping basket and a cart, and the put-down area 164 may be one or more of a distribution belt, counter, shopping basket or shopping cart, each of which may entail different motions. The vectors 154 each represent an observed motion relative to other actions 162 of a cashier and observable in a video feed, illustratively including unloading items, and getting and scanning loyalty cards, supervisor/assistant override cards, coupons or other bar-code cards. Each barcode scan B (available from a separate stream of POS data) should correspond to a set PSD of the three different image primitives types.

Figure 2:
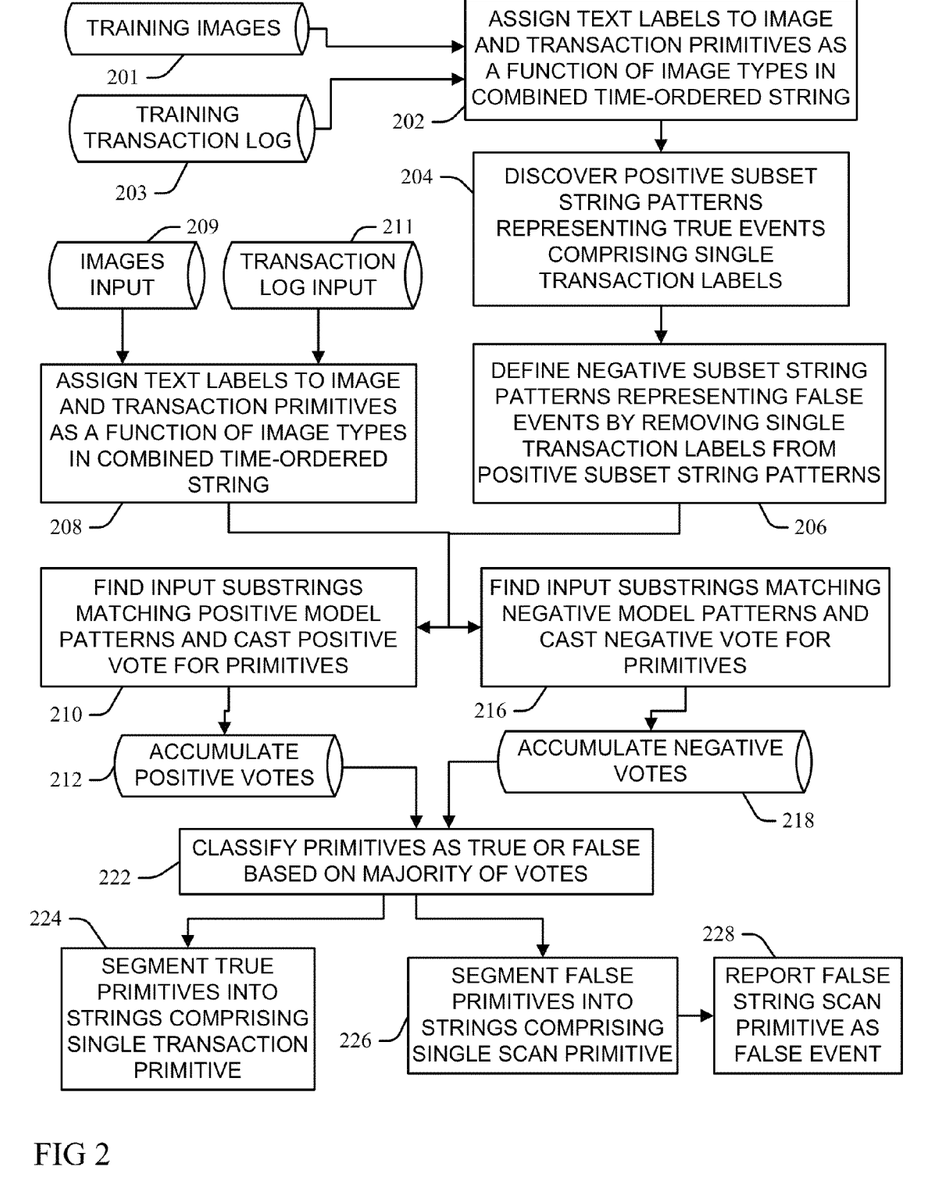
FIG. 2 is a block diagram illustration of an embodiment of a method or system for classifying events through string pattern recognition according to the present invention.

FIG. 2 illustrates one embodiment of a process or system for classifying events through string pattern recognition according to embodiments of the present invention. At 202 text labels are assigned to image primitives in a set of training images 201 and to related time-ordered transactions in an associated training transaction log 203 in a combined time-ordered training string of text primitives. The training transactions are discrete and sequential and should be associated uniquely with images in the primitive stream. Each transaction in the training log 203 should be associated with one of at least three types of the primitive images in the set of training images 201, which are labeled accordingly: an image of the start of the transaction is labeled with a start image text label, an image of an entry of the transaction into the log is labeled with an entry image text label, and an image of the conclusion of the transaction is labeled with an ending image text label. More particularly, the text labels assigned at 202 identify the image types relative to the transactions, determined by using appropriate primitive detection modules in a computer vision system or through manual review of the image content.

At 204 a plurality of variable length positive subset string patterns representing true events are discovered from time-ordered training strings of text primitives that each observe a maximum length limit, are each repeated in at least two of the training strings, start with a start image label, end with an ending image label, and comprise a single transaction primitive. This may be achieved manually or by using an efficient pattern discovery algorithm (for example Teiresias, though others may be practiced). The positive subset string patterns determined at 204 are used to define a conjugate plurality of negative subset string patterns at 206 by removing the single transaction primitive from each of the plurality of positive subset string patterns.

Thus, given a primitive stream input 209 comprising a sequential stream of time-ordered still images (for example, from a video stream or a sequential stream of time-ordered still images, etc.) corresponding to time-ordered transactions in a transaction stream input 211, at 208 text labels are assigned to the primitive stream input 209 image primitives and to related time-ordered transactions in the associated transaction stream input 211 in a combined time-ordered input string of text primitives. At 210 the process finds substrings within the combined time-ordered input string of text primitives formed from the new inputs 209/211 that match the positive subset string patterns determined at 204, wherein each match contributes a positive vote to each component primitive within said matching substring and the positive votes are accumulated at 212 for each primitive. The process also finds at 216 substrings within the combined time-ordered input string of text primitives formed from the new inputs 209/211 that match the negative subset string patterns determined at 208, wherein each match contributes a negative vote to each component primitive within said matching substrings and the negative votes are accumulated at 218 for each primitive.

At 222 the process classifies (labels) each primitive as belonging to a true (T) or a false (F) scan class based on a majority of the accumulated positive and negative votes, and further as subject to having a minimum number of majority votes relative to a competing class; otherwise, the primitive is left unclassified. At 224 continuous stretches of T's in the classified stream are segmented into true transaction subset strings, such that each transaction string has a single transaction primitive, and at 226 continuous stretches of F's in the classified stream are segmented into false transaction subset strings such that each false transaction subset string has a single entry image primitive. Thus, the process may report the entry images within the false transaction subset strings at 228 as detected false events.

In an embodiment of the present invention implemented in the retail context of FIG. 1, the primitive images are a sequence of images of transactions at a retail scanner, wherein each is identified and labeled as one of three types of primitive images: with a P if an image of a pickup of an item by a cashier signifying a possible start of a retail scanning transaction (the start image); an S if an image of passing an item across a bar code scanner which should result in a bar code entry in the associated transaction log (the entry image); or a D if an image of a drop or other disposal of the item by a cashier, which should signify the conclusion of the bar code entry transaction (the ending image).

Video input may be analyzed to recognize and generate the individual primitives P, S and D through a variety of methods and systems. The video input data may also be provided as one of the respective primitives to embodiments of the present invention, for example by one or more service providers or other devices or processes. Some embodiments of the present invention utilize an efficient vision technique proposed to detect Pickup (P), Scan (S), and Drop (D) primitives from an input retail video stream based on an observation that each primitive P, S, D follows a specific motion pattern, wherein each primitive is an in/out process in which the cashier's hand enters and exits a pick-up area 156, scan area 160 and drop-off area 164 region of interest (ROI). In some embodiments, a hand color model is adaptively learned to detect hand motion by continuously collecting hand pixel examples, and based on the model each pixel in a motion map computed by frame differencing is classified as hand pixel or not, to form a hand motion map for each video frame. Such mapping may explicitly capture hand motion robustly in the presence of motion noise from belt movement, background changes, and customer interactions. A hierarchical Finite State Machine (FSM) may be applied to deterministically check whether or not the hand motion follows the predefined in/out pattern corresponding to each primitive. After the primitives P, S, D are thus detected and labeled, the labels are combined at 202 with the labeled barcode primitives (B) from the transaction log data to form the temporally-ordered text string at 202 comprising the labels {P, S, D, B}.

Embodiments of the present invention model possible variations within activities in videos of transactions by fusing visual information with transaction events provided by the transaction log data. In the example of FIG. 1, the learnt model is used to detect potential losses caused by non-compliant checkouts. Video streams are treated as discrete primitive streams, and various primitive patterns of item checkouts are discovered using a pattern discovery algorithm. The inputs to the pattern discovery algorithm are text strings formed from temporally ordering the output of the primitive detectors and the POS data. By treating a barcode as another primitive, the alphabet set from which the text strings are formed has a cardinality of four: {P, S, D, B}. The output of the pattern discovery algorithm is a set of patterns within the input strings that are repeated at least a minimum number of times across those strings. Only those patterns that have a single barcode (B) primitive within them and with any possible configuration of the other three primitives around it are selected and the others are discarded. The presence of a barcode within a small time window around a detected visual scan may thus confirm a valid checkout, i.e. no fraud or operational error, wherein the absence of a barcode around a detected visual scan is a potential candidate for a fraud.

Various patterns of item checkouts may be discovered using Teiresias or another efficient pattern discovery algorithm. The inputs to the pattern discovery algorithm are text strings formed from temporally ordering the output of the primitive detectors and the bar code transaction log (TLog) data. By treating the barcode as another primitive, the alphabet set from which the text strings are formed has a cardinality of four: {P, S, D, B}. The output of the pattern discovery algorithm is a set of patterns within the input strings that are repeated at least a minimum number of times across those strings. Only those patterns that have a single barcode B primitive within them and with particular configurations of the other three primitives around it are selected and the others are discarded. In general, most item checkouts in retail transactions are genuine, and fake (or false) checkouts are very rare. With this assumption, the selected patterns are representative of single item checkouts and model the variations in the process of checking out an item represented as a combination of discrete primitives. Conceptually, a fake scan or a fraudulent item checkout is similar in essence to a genuine checkout except that a barcode is not registered in the TLog. So a model representing fake scans is derived from the model for true scans by discarding the barcode primitives from the pattern set.

Embodiments of the present invention may follow a Bayesian approach, wherein the positive and negative votes are transformed into posterior likelihoods of the primitive being a part of a true or a fake, false scan. More particularly, a classification based on maximum posterior likelihood (above a certain minimum confidence level) is done to assign the primitive to the most likely class, and a grouping of the classified primitives based on their class labels and temporal adjacency leads to a segmentation of the transaction stream into true and false scans.

Some embodiments of the present invention utilize Teiresias algorithm processes and systems for discovering repeated patterns across finite alphabet streams. Teiresias discovers all unique "<L,W> maximal" patterns having a certain minimum support K within a given set of alphabetic sequences. An <L,W> pattern is defined to be one in which every sub-pattern of length W or more has at most (W−L) wildcard characters, and wherein the others are alphabet characters. The term "maximal" implies that the discovered patterns cannot be made more specific without reducing their support sets within the input streams. The computational complexity of the algorithm is seen to scale quasi-linearly with the size of the output patterns, hence making it a very efficient pattern discovery tool.

The Teiresias pattern discovery algorithm is used to discover patterns that are representative of genuine item scans within retail transactions, wherein a transaction is a stream of P, S, D and B primitives, and wherein the ordering is determined by their occurrence in time. Since a typical item checkout involves picking, scanning and then dropping it, some representative patterns that correspond to this process would be PSBD, PBSD or PSDB, allowing for time delays in primitive detection or barcode registration. More particularly, the presence of a barcode B within a small time window around a detected visual scan triplet PSD may confirm a valid checkout, i.e. no fraud or operational error, and the absence of a barcode around a detected visual scan may indicate a potential candidate for non-compliance. However, the output of such primitive and event detection modules is not a single PSD triplet for every checkout. The primitive sequence output by the detection system is usually noisy, with repetitions or missing occurrences of one or more of the P, S and D primitives. Some of the sub-events may be repeated more than once or may not even be detected. One common situation arises when a cashier has difficulty scanning the item in a single attempt and ends up doing multiple scans resulting in repeated S primitives for a single item. This poses difficulties to any approach looking for the presence of a PSD triplet corresponding to an item checkout.

Thus, there are a number of other patterns that are possible due to noisy primitive streams rendered by the primitive detector and TLog data. Some typical examples include:

1. Multiple scan: An item is scanned more than once before a successful barcode registration. Illustrative but not exhaustive patterns include PSDSBD and PSDSDSBD.

2. Late barcode: A successful scan but a delay in the arrival of barcode might result in patterns such as PSDB, PSDPSB, etc. Such patterns might also result from items which have to be manually registered at the POS without scanning, for example as is common with vegetable and fruit produce items in a retail grocery context.

3. Parallel scan: Following a successful scan, an item is dropped after the next item in the pickup queue is picked up. This can be represented using PSPBD, PSBPD, etc.

Variations in patterns representing item scans are captured by mining primitive streams resulting from transactions for patterns that repeat across transactions. Most of the item checkouts in transactions are true scans with a barcode being registered for each scan. Therefore, patterns that are repeated across transactions and have a single barcode (B) primitive within them may be assumed to correspond to true scans. Embodiments of the present invention seek such patterns by first discovering unique maximal <L,W> patterns with support at least K from a set of transactions, employing the Teiresias algorithm. This process is repeated for a few different L=W values to capture representative patterns of different lengths, i.e., with different levels of noise embedded in them. Setting L=W ensures that the resulting patterns do not have any wildcard characters so that exact pattern matching can be done using those patterns. In some embodiments, the L=W values range from 3 to 10. By choosing a conservative value of K (for example, 2) even patterns that are repeated only once may be captured. From the resulting set, only those patterns that match the regular expression {P[PSD]*B[PSD]*D} are retained. These are all the single barcode B patterns that start with a pickup P and end in a drop D primitive with any possible number and arrangement of P, S and D primitives between them.

The patterns thus derived define a model for true, positive model scans. Generally, false scans are similar to true scans but without the registration of a barcode, and thus a corresponding negative model may be constructed for false scans by eliminating the B primitive from the true scan patterns. The positive and negative models are then used in a pattern matching scheme for classifying primitives within transaction streams as belonging to either a true or a false scan.

The output of a Teiresias algorithm may be a set of unique maximal patterns for a particular setting of the <L, W> parameter values. Embodiments of the present invention capture various levels of noise in the representation of a true scan by discovering patterns with different settings for L=W. This leads to some redundancy in the discovered pattern set in that a few patterns are repeatedly discovered for two different settings of L=W and there are overlaps between some patterns. One example of an overlapping pair of patterns is PSB and SBD, which form sub-patterns of the canonical true scan pattern PSBD. This might be the result of slightly different support sets for the two patterns caused by a missing P or a D primitive in one of the scans within the input transactions. Repetitions are easily taken care of by retaining only the unique patterns.

One way to account for overlaps is to find all pairs of patterns with overlaps among them and stitch them together into longer and longer patterns in an iterative process. But this approach has a high likelihood of reducing the support set of the resulting longer patterns relative to the component patterns if the component patterns did not come from a single parent pattern. This is not desirable because each of the overlapping patterns may uniquely represent a true scan with some missing primitives.

In contrast, in order to address redundancy due to overlapping patterns, embodiments of the present invention do a pattern-transaction co-occurrence analysis, for example a latent semantic analysis wherein a pattern-transaction co-occurrence matrix C is constructed, each row in the matrix corresponding to a unique discovered pattern and each column to an input transaction used for pattern discovery: the (i, j) the entry of the matrix is a count of the number of times pattern i appears in the jth transaction. Usually, C is a sparse matrix with a few positive entries scattered among zeros. Each row of this sparse matrix can be thought of as a representation of the corresponding pattern in a space of dimensionality equal to the number of transactions used for pattern discovery. In general, these dimensions are not uncorrelated. So a measure of similarity among patterns such as the correlation coefficient cannot be reliably computed in this space. A singular value decomposition (SVD) is performed on the co-occurrence matrix C, resulting in the following factorization of C:

$$C = U \Sigma V^T \quad (1)$$

where U and V are orthogonal matrices of size m*m and n*n, assuming C is of size m*n, i.e., there are a total of m patterns discovered from a set of n transactions. $\Sigma$ is a rectangular matrix with only non-zero elements along its diagonal, which correspond to singular values. The columns of U and V are the eigenvectors of $CC^T$ and $C^TC$ respectively. Choosing only the first k largest singular values and the corresponding eigenvectors leads to the best rank k approximation of C in the least squares sense. Further, each row of matrix U is a representation of the corresponding pattern (in C) in an orthogonalized space.

Since the number of transactions n is usually much smaller than the number of patterns m, there are only n non-zero singular values in the SVD of C. Therefore, only the first n columns of U comprise a full representation of the patterns in an orthogonal space while allowing a complete reconstruction of C. A correlation coefficient computed in this space is a more reliable measure of similarity between patterns based on their co-occurrence within the transactions, and is used for clustering patterns together that have a high correlation among them. In a greedy agglomerative clustering scheme the patterns are first ordered in a decreasing order of their total number of occurrences, then all the patterns that have a high correlation (>0.5) with the most repeated pattern are put into one cluster. This is repeated with the next available most repeated pattern and so on until all patterns are exhausted. Each cluster is then represented by the most occurring pattern among its members, with only the cluster representatives used for pattern matching.

The discovered patterns are used to build two tables: one corresponding to true scans (positive) and the other corresponding to false scans (negative). The two tables contain the same set of patterns except for the barcode primitive being deleted from each pattern in the negative set. Given a primitive stream from a new transaction, each primitive in the stream is assigned a true or false scan label based on a pattern matching and classification procedure using the two pattern sets. Each pattern in the positive set contributes a positive vote to every primitive of any corresponding substring it matches within the transaction stream. Similarly, negative votes are accumulated for each primitive based on how many patterns in the negative set exactly match a substring containing the primitive. These votes are used for classifying the primitives.

More particularly, each primitive p in the input transaction stream is assigned a true (T) or a false (F) scan label depending on the number of votes it has accumulated for the two categories. In order to do this classification, a Bayesian framework is adopted. Let $S_T$ and $S_F$ denote the sets of all true and false scan patterns, respectively. Then the likelihood of the primitive p being a part of a true scan can be written as:

$$P(T|p) \propto P(T,p) \quad (2)$$

Similarly, the likelihood of p belonging to a false scan is given by:

$$P(F|p) \propto P(F,p) \quad (3)$$

Embodiments of the present invention define the joint likelihoods P(T, p) and P(F, p) to be the probabilities of the context of p belonging to the set $S_T$ and $S_F$ respectively, as follows:

$$P(T,p) \equiv P(p\text{-context} \in S_T) \quad (4)$$

$$P(F,p) \equiv P(p\text{-context} \in S_F) \quad (5)$$

where "p-context" is used to denote the context or neighborhood of p. The above likelihoods are proportional to the number of patterns in $S_T$ and $S_F$ respectively that match a sub-string containing p. If we denote the positive and negative votes accumulated by p with $\text{Votes}_T(p)$ and $\text{Votes}_F(p)$ respectively, then:

$$P(p\text{-context} \in S_T) \propto \text{Votes}_T(p) \quad (6)$$

$$P(p\text{-context} \in S_F) \propto \text{Votes}_T(p) \quad (7)$$

Appropriate normalization of the cumulative votes of the primitive p for the two categories yields the posterior probabilities P(T|p) and P(F|p). The primitive is assigned to the class with the maximum posterior likelihood given it is above a certain threshold value.

Classification of a transaction's primitive stream results in a class label (T or F) for those primitives whose posterior likelihoods for the respective class are above the chosen threshold. Other primitives remain unclassified. This usually results in continuous stretches of T's and F's with unclassified primitives in between them. One continuous stretch of T or F labels need not necessarily correspond to a single true or false scan, respectively. A segmentation procedure groups subsets of adjacent primitives that are assigned T labels into true scans. This is achieved by choosing a B primitive within each such subset as the anchor for the corresponding true scan. Other primitives such as P, S and D that form a part of the true scan are searched for locally, i.e., the nearest ones to the anchoring B primitive within a small window. The size of the window is limited to the set of non-B primitives around the anchor, which have been classified as belonging to the class T. Only one P, S and D primitive is assigned to a true scan.

Among the available P's and S's within a window, preference is given to the ones that occur closest to B but earlier in the stream. On the other hand, a D that is closest to B but occurs later in the stream is preferably assigned to the true scan. In the absence of a P, S or D primitive within the neighborhood window of an anchoring B, a new such primitive is created and assigned to the true scan. Similar segmentation is performed to detect false scans using S primitives labeled as belonging to class F as anchors and searching for the nearest P and D primitives. In order to keep the number of false positives manageable, embodiments of the present invention assume that at least one each of P, S and D primitives should be present to provide enough evidence for a false scan and that two successive false scans be at least three seconds apart.

Within a transaction stream, a primitive is assigned a vote by each of the patterns matching a sub-string containing the primitive. However, a voting scheme where each pattern contributes the same vote to the matching primitives might not be optimal. A goal of the embodiments of the present invention is to be able to reliably distinguish true scans from false scans based on the discovered patterns. Not all the patterns contain the same amount of information to distinguish between the two classes, and there may still be some redundancies left among patterns filtered out by co-occurrence analysis. Therefore, it is not guaranteed that each pattern contributes independent information relative to others in the set. Further, some of the patterns may even be noisy, for example resulting from missing or multiple primitive detections for single pickup, scan or drop events during transactions. Thus, embodiments of the present invention weight patterns that carry independent information and are the most important for classification more heavily relative to other patterns, through weighting schemes that assign different relative votes to the patterns.

Embodiments utilize a frequency weighting scheme wherein each pattern is assigned a weight inversely proportional to the number of times it occurs across all the transactions used for pattern discovery. This may be a mostly empirical weighting scheme driven by experimentation, for example by trying different heuristic schemes based on the frequency of patterns and the size of their clusters in the co-occurrence analysis discussed above. Such approaches may provide good results in terms of the number of falsely detected fake scans relative to the total number of detected true scans. A possible reason might be that smaller patterns tend to occur more frequently than longer ones among discovered patterns. Using a uniform voting scheme, the smaller patterns have a higher influence in the classification decision of a majority of primitives because smaller patterns match more sub-strings than longer ones. Further, each pattern in the negative (F) class is one primitive shorter than its counterpart in the positive class. All these factors contribute to an increased number of short noisy primitive segments that are assigned to the negative (F) class in the segmentation step. With the inverse frequency based voting scheme, longer (less frequent) patterns influence the classification decision of many primitives leading to longer, less noisy segments of continuous T or F labels; however, this scheme may cause many genuine false scans to be missed. In order to circumvent this problem, a weighting scheme may be employed wherein weights are derived from a classifier trained to distinguish true from false scans using ground truth data.

Embodiments also use Support Vector Machine (SVM) weights in classification, which has a number of favorable properties including superior generalization ability. A two-class SVM may estimate a hyperplane separating the training points in a feature space such that the margin between the hyperplane and the two classes is maximized. Assuming a linear kernel SVM, the weights are indicative of how useful the corresponding features are for the purpose of classification. The SVM may be used to learn the relative importance of the discovered patterns for classifying a primitive into true or false scan based on the matches to its context. In some implementations, a set of training points belonging to true and false scan classes are sampled and mapped onto a feature space with dimensionality equal to the number of patterns, wherein the training points are a set of primitive strings centered around the B primitive for a true scan and the S primitive for a false scan. The B primitive locations of true scans may be randomly sampled from a set of transaction streams used for training, leaving out those transactions which have a false scan in them, and wherein the locations of false scans in the transaction streams may be hand labeled by a visual inspection of the corresponding videos.

There is generally a large imbalance in the number of training points for the two SVM classes: for example, in one implementation a total of 13 false scans were present in training data consisting of 1660 transactions, with the number of randomly sampled true scan points from the training data in the order of a few hundred. Training on such data may lead to an SVM biased towards the class with the larger size. SVM training may account for such large data imbalances for the two classes through under-sampling the majority class, oversampling the minority class, or adjusting the SVM margin to reduce the bias towards majority class, and still other techniques will be apparent to one skilled in the art.

Figure 3:
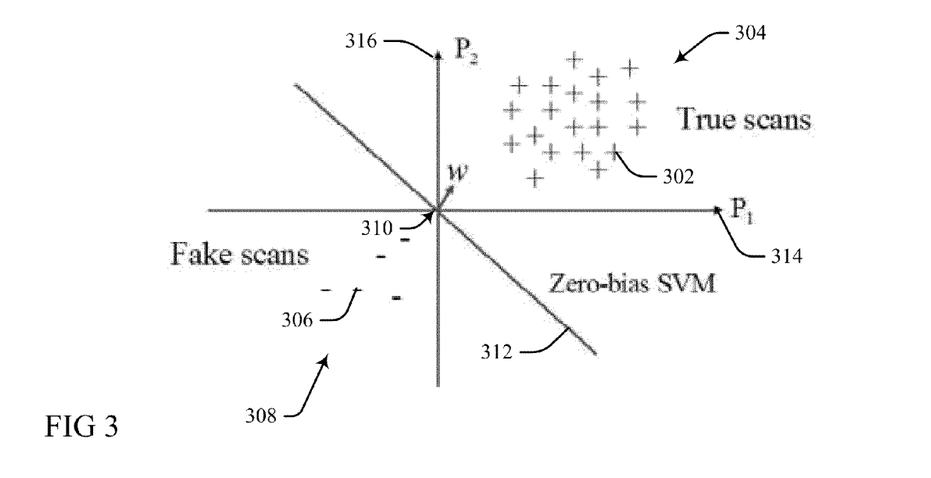
FIG. 3 is a graphical illustration of a mapping of a Support Vector Machine hyperplane according to the present invention.

Embodiments may use SVM to learn weights for feature dimensions corresponding to patterns that quantify the importance of those patterns for classification. It is desirable to have a non-negative weight for each pattern in order to more easily enable interpretation of the weights. Accordingly, in order to avoid the data imbalance effects and to ensure positive weights, embodiments learn a zero-bias SVM with a particular mapping of the true and false scans into a feature space. For example, FIG. 3 illustrates a mapping of an SVM hyperplane 312 in a 2D space corresponding to patterns $P_1$ 314 and $P_2$ 316. The mapping is such that the true scan points 302 always lie in a positive hyper-quadrant 304 and the false (fake) scan points 306 in a negative hyper-quadrant 308, wherein a hyper-quadrant refers to the extension of a quadrant in a 2D space to a higher dimensional space. The positive hyper-quadrant 304 is the set of all possible points with only positive coordinates, and similarly the negative hyper-quadrant 308 is the set of all possible points with only negative coordinates. The sampled true scan points 302 are matched with the set of patterns in the positive set to obtain a feature vector for each of those points. Only the dimensions corresponding to the patterns with exact matches are set to suitable non-zero positive values, and the others are zero. Similarly, the feature vectors for fake scan points 306 are obtained by pattern matching with the negative set of patterns, wherein the values for the dimensions with exact matches are set to suitable negative values.

The mapping into the feature space can be done in many different ways. In some embodiments, an asymmetric mapping scheme between the true and fake scan training points is utilized, wherein the positive value assigned to a match between a true scan and a pattern is proportional to the frequency of the pattern, but wherein a same negative value is assigned to all the fake scan point and pattern matches regardless of the pattern. Such a mapping causes true scan points that match to only a few of the patterns occurring less frequently to be moved more towards the origin 310 in the feature space relative to others. Since the SVM hyperplane 312 passes through the origin 310, it seems that points matching to less frequent patterns are most likely to be the support vectors, which influence the final weights. This has a tendency to favor lesser numbers of false positives in implementation results.

Frequency and SVM weighting approaches may also be combined. More particularly, SVM-based weights emphasize those patterns that are useful for distinguishing true and false scan points within training data, and also lead to an increased number of genuine false scan detections (true positives) within all the data relative to using frequency weights. However, the false positive performance of a classifier using SVM weights may be worse compared to one using frequency weights. Accordingly, some embodiments combine the two weights by summing them (Frequency+SVM), wherein the combined weights help achieve a better false positive performance relative to the SVM weights alone, and better true positive performance relative to the frequency weights alone. The combined weights generally reinforce only those frequently occurring short patterns that are useful for classification.

It will be appreciated that embodiments of the present invention may be utilized in a variety of applications wherein visual events may be associated with discrete, time-ordered transactions: illustrative but not exhaustive examples include turnstile admissions, vehicles detected in relation to a transit point, badge or card swipes from an automated door lock, ticket kiosk, etc. For example, visual events may be created with respect to human movements in certain areas and matched to turnstile admissions, vehicles detected in relation to a transit point, badge or card swipes from an automated door lock, ticket kiosk, etc., which indicate trespassing, theft, unauthorized access to restricted areas, etc. Approaches may focus on a variety of data outputs associated with human activities, for example business transaction logs, retail receipts, injury reports, etc. Thus, though embodiments are described above with respect to bar code scans, the present invention is not limited to only those examples.

Figure 4:
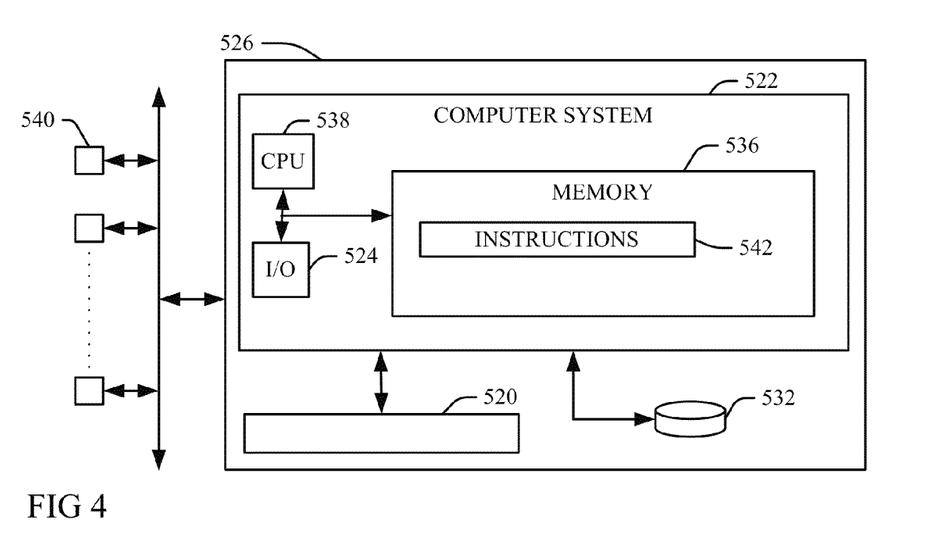
FIG. 4 is a block diagram of a computerized implementation of an embodiment of the present invention.

Referring now to FIG. 4, an exemplary computerized implementation of an embodiment of the present invention includes computer or other programmable device 522 in communication with other devices 540 (for example, video cameras or video servers, or memory devices comprising a database of images, etc.). Instructions 542 reside within computer readable code in a computer readable memory 536, or in a computer readable storage system 532, another device 540 or other computer readable storage medium that is accessed through a computer network infrastructure 526 by a processing unit (CPU) 538. Thus, the instructions, when implemented by the processing unit (CPU) 538, cause the processing unit (CPU) 538 to classify events through string pattern recognition as described above with respect to FIGS. 1 through 3.

Figure 5:
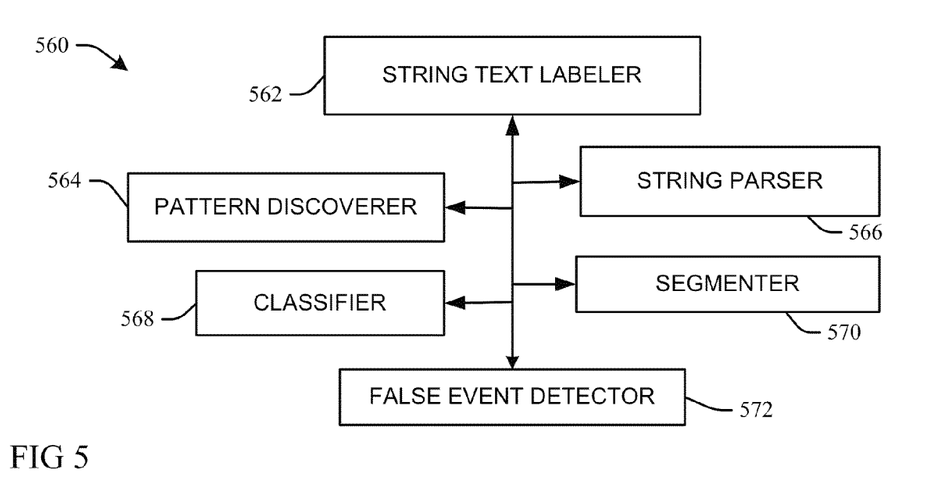
FIG. 5 is a block diagram of an article that classifies events through string pattern recognition according to the present invention.

FIG. 5 illustrates an article 560 (for example, a programmable device, system, etc.) according to the present invention that classifies events through string pattern recognition as described above with respect to FIGS. 1 through 4. One or more of the components of the article 560 are tangible devices that perform specific functions, for example comprising the processing unit 538, the computer readable memory 536 and the computer readable storage medium 532 described above. Thus, as understood by reference to FIGS. 1-4 and the associated description material above, a String Text Labeler 562 assigns text labels to image primitives in a time-ordered set of images and to related time-ordered transactions in an associated training log in a combined time-ordered string of text labels as a function of image types. A Pattern Discoverer 564 discovers positive subset string patterns representing true events from the combined time-ordered string of text labels that are each repeated in at least two of the positive subset strings, start with a start image label, end with an ending image label, and comprise a single transaction primitive label, and that defines a plurality of negative subset string patterns by removing the single transaction primitive label from each of the plurality of positive subset string patterns.

A String Parser 566 finds substrings within the combined time-ordered string of text labels that match the positive and negative subset string patterns, wherein each positive subset string pattern match contributes a positive vote, and each negative subset string pattern match contributes a negative vote, to each component primitive and within the respective matching substrings. A Classifier 568 classifies the labeled primitives into a classified string of text labels as belonging to a true class if their accumulated positive votes exceed their accumulated negative votes, or as belonging to a false class if their accumulated negative votes exceed their accumulated positive votes. A Segmenter 570 segments the classified, labeled primitives into true or false transaction subset strings such that each false transaction subset string has a single entry image primitive; False Event Detector 572 reports entry images within each of the false transaction subset strings as detected false events.

Embodiments of the present invention may also perform process steps of the invention on a subscription, advertising, and/or fee basis. That is, a service provider could offer to learn detectors and/or find detected objects in video data as a function of semantic attributes including motion direction as described above with respect to FIGS. 1-5. Thus, the service provider can create, maintain, and support, etc., a computer infrastructure, such as the network computer system 522, network environment 526, and/or the article 560 (or parts thereof) that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computers/devices 522, from a computer-readable medium device 536, 520 or 540; (2) adding one or more computing devices to a computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for classifying events through string pattern recognition, the method comprising:

assigning text labels to image primitives in a time-ordered set of training images and to related time-ordered transactions in an associated training transaction log in a combined time-ordered training string of text labels as a function of image types, the assigning comprising labeling a transaction in the associated training transaction log with a transaction label, a training primitive image of a start of a transaction with a start image text label, a training primitive of an entry of a transaction into the log with an entry image text label, and a training primitive of a conclusion of a transaction with an ending image text label;

discovering via a processor a plurality of positive subset string patterns representing true events from the combined time-ordered training string of text labels that are each repeated in at least two of the positive subset string patterns, start with a start image label, end with an ending image label, and comprise a single transaction primitive label; and defining a plurality of negative subset string patterns by removing the single transaction primitive label from each of the plurality of positive subset string patterns.

2. The method of claim 1, further comprising:

assigning text labels to time-ordered image primitives in input image data and to related time-ordered transactions in an associated input transaction log in a combined time-ordered input string of text labels, the assigning comprising labeling a transaction in the associated input transaction log with the transaction label, an input primitive image of a start of a transaction with the start image text label, an input primitive image of an entry of a transaction into the log with the entry image text label, and an input primitive image of a conclusion of a transaction with the ending image text label;

finding substrings within the combined time-ordered input string of text labels that match the discovered positive subset string patterns, wherein each positive subset string pattern match contributes a positive vote to each component primitive within said matching input substring;

accumulating the positive votes for each labeled input primitive;

finding substrings within the combined time-ordered input string of text labels that match the defined negative subset string patterns, wherein each negative subset string pattern match contributes a negative vote to each component primitive within said matching input substring;

accumulating the negative votes for each labeled input primitive;

classifying each of the labeled input primitives into a classified string of text labels as belonging to a true class if their accumulated positive votes exceed their accumulated negative votes, or as belonging to a false class if their accumulated negative votes exceed their accumulated positive votes;

segmenting continuous stretches of the classified string false labels into false transaction subset strings such that each false transaction subset string has a single entry image primitive; and reporting the entry images within each of the false transaction subset strings as detected false events.

3. The method of claim 2, wherein the discovering the positive subset string patterns further comprises:

discovering a plurality of positive subset string patterns representing true events from the combined time-ordered training strings of text labels that each also observe a maximum length limit.

4. The method of claim 3, wherein the discovering the plurality of positive subset string patterns representing true events further comprises:

using a Teiresias pattern discovery algorithm to discover the plurality of positive subset string patterns representing true events that discovers all repeated unique maximal <L, W> patterns that each have a given maximum number of (W−L) wildcard characters within any of their substrings of a given length (W).

5. The method of claim 4, wherein the discovering the plurality of positive subset string patterns representing true events further comprises:
constructing a co-occurrence matrix, each row in the matrix corresponding to a unique discovered pattern and each column to an input transaction used for pattern discovery; and
performing a singular value decomposition on the co-occurrence matrix.

6. The method of claim 4, wherein the step of classifying each of the labeled input primitives into the classified string of text labels as belonging to the true class or as belonging to the false class further comprises:
determining respective likelihoods of labeled input primitives as being a part of a true or a false event as a function of the context of the primitives and in relative proportion to a total number of positive and negative subset string patterns that match a substring containing the primitive; and
assigning the labeled input primitives to one of the true and false classes having a higher determined likelihood.

7. The method of claim 6, further comprising:
weighting the discovered positive and negative subset string patterns as a function of frequency weightings determined in inverse proportion to their occurrence frequency across all transactions used for pattern discovery.

8. The method of claim 7, wherein the step weighting the discovered positive and negative subset string patterns as the function of the frequency weightings further comprises:
determining support vector machine weightings for the discovered positive and negative subset string patterns by learning relative importances of the discovered patterns for classifying a primitive into true or false scan based on matches to their contexts; and
weighting each of the discovered positive and negative subset string patterns by respective sums of their frequency weightings and their support vector machine weightings.

9. A method of providing a service for classifying events through string pattern recognition, the method comprising:
providing a string text labeler device that assigns text labels to image primitives in a time-ordered set of images and to related time-ordered transactions in an associated training log in a combined time-ordered string of text labels as a function of image types; and
providing a pattern discoverer device that discovers positive subset string patterns representing true events from the combined time-ordered string of text labels that are each repeated in at least two of the positive subset strings, start with a start image label, end with an ending image label, and comprise a single transaction primitive label, and that defines a plurality of negative subset string patterns by removing the single transaction primitive label from each of the plurality of positive subset string patterns.

10. The method of claim 9, further comprising:
providing a string parser device that finds substrings within the combined time-ordered string of text labels that match the positive and negative subset string patterns, wherein each positive subset string pattern match contributes a positive vote, and each negative subset string pattern match contributes a negative vote, to each component primitive and within the respective matching substrings;
providing a classifier device that classifies the labeled primitives into a classified string of text labels as belonging to a true class if their accumulated positive votes exceed their accumulated negative votes, or as belonging to a false class if their accumulated negative votes exceed their accumulated positive votes;
providing a segmenter device that segments the classified, labeled primitives into true or false transaction subset strings such that each false transaction subset string has a single entry image primitive; and
providing a false event detector device that reports entry images within each of the false transaction subset strings as detected false events.

11. The method of claim 10, wherein the pattern discoverer device discovers the positive subset string patterns by discovering a plurality of positive subset string patterns representing true events from the combined time-ordered training strings of text labels that each also observe a maximum length limit.

12. The method of claim 11, wherein the pattern discoverer device discovers the plurality of positive subset string patterns representing true events by using a Teiresias pattern discovery algorithm to discover the plurality of positive subset string patterns representing true events that discovers all repeated unique maximal <L, W> patterns that each have a given maximum number of (W−L) wildcard characters within any of their substrings of a given length (W).

13. The method of claim 12, wherein the pattern discoverer device discovers the plurality of positive subset string patterns representing true events by:
constructing a co-occurrence matrix, each row in the matrix corresponding to a unique discovered pattern and each column to an input transaction used for pattern discovery; and
performing a singular value decomposition on the co-occurrence matrix.

14. The method of claim 13, wherein the classifier device classifies each of the labeled input primitives into the classified string of text labels as belonging to the true class or as belonging to the false class by:
determining respective likelihoods of labeled input primitives as being a part of a true or a false event as a function of the context of the primitives and in relative proportion to a total number of positive and negative subset string patterns that match a substring containing the primitive; and
assigning the labeled input primitives to one of the true and false classes having a higher determined likelihood.

15. A system, comprising:
a processor;
a computer readable memory in circuit communication with the processor; and
a computer-readable storage medium in circuit communication with the processor and the computer readable memory;
wherein the processor, when executing program instructions stored on the computer-readable storage medium via the computer readable memory:
assigns text labels to image primitives in a time-ordered set of training images and to related time-ordered transactions in an associated training transaction log in a combined time-ordered training string of text labels as a function of image types, the assigning comprising labeling a transaction in the associated training transaction log with a transaction label, a training primitive image of a start of a transaction with a start image text label, a training primitive of an entry of a transaction into the log with an entry image text label, and a training primitive of a conclusion of a transaction with an ending image text label;

discovers a plurality of positive subset string patterns representing true events from the combined time-ordered training string of text labels that are each repeated in at least two of the positive subset string patterns, start with a start image label, end with an ending image label, and comprise a single transaction primitive label; and defines a plurality of negative subset string patterns by removing the single transaction primitive label from each of the plurality of positive subset string patterns.

16. The system of claim 15, wherein the processor, when executing the program instructions stored on the computer-readable storage medium via the computer readable memory, further:

assigns text labels to time-ordered image primitives in input image data and to related time-ordered transactions in an associated input transaction log in a combined time-ordered input string of text labels, the assigning comprising labeling a transaction in the associated input transaction log with the transaction label, an input primitive image of a start of a transaction with the start image text label, an input primitive image of an entry of a transaction into the log with the entry image text label, and an input primitive image of a conclusion of a transaction with the ending image text label;

finds substrings within the combined time-ordered input string of text labels that match the discovered positive subset string patterns, wherein each positive subset string pattern match contributes a positive vote to each component primitive within said matching input substring;

accumulates the positive votes for each labeled input primitive;

finds substrings within the combined time-ordered input string of text labels that match the defined negative subset string patterns, wherein each negative subset string pattern match contributes a negative vote to each component primitive within said matching input substring;

accumulates the negative votes for each labeled input primitive;

classifies each of the labeled input primitives into a classified string of text labels as belonging to a true class if their accumulated positive votes exceed their accumulated negative votes, or as belonging to a false class if their accumulated negative votes exceed their accumulated positive votes;

segments continuous stretches of the classified string false labels into false transaction subset strings such that each false transaction subset string has a single entry image primitive; and reports the entry images within each of the false transaction subset strings as detected false events.

17. The system of claim 16, wherein the processor, when executing the program instructions stored on the computer-readable storage medium via the computer readable memory, further discovers the positive subset string patterns by discovering a plurality of positive subset string patterns representing true events from the combined time-ordered training strings of text labels that each also observe a maximum length limit.

18. The system of claim 17, wherein the processor, when executing the program instructions stored on the computer-readable storage medium via the computer readable memory, further discovers the plurality of positive subset string patterns representing true events by using a Teiresias pattern discovery algorithm to discover the plurality of positive subset string patterns representing true events that discovers all repeated unique maximal <L, W> patterns that each have a given maximum number of (W−L) wildcard characters within any of their substrings of a given length (W).

19. The system of claim 18, wherein the processor, when executing the program instructions stored on the computer-readable storage medium via the computer readable memory, further classifies each of the labeled input primitives into the classified string of text labels as belonging to the true class or as belonging to the false class by:

determining respective likelihoods of labeled input primitives as being a part of a true or a false event as a function of the context of the primitives and in relative proportion to a total number of positive and negative subset string patterns that match a substring containing the primitive; and assigning the labeled input primitives to one of the true and false classes having a higher determined likelihood.

20. The system of claim 19, wherein the processor, when executing the program instructions stored on the computer-readable storage medium via the computer readable memory, further weights the discovered positive and negative subset string patterns as a function of frequency weightings determined in inverse proportion to their occurrence frequency across all transactions used for pattern discovery.

21. An article of manufacture, comprising:

a tangible computer readable storage hardware device having computer readable program code embodied therewith, the computer readable program code comprising instructions that, when executed by a computer processor, cause the computer processor to:

assign text labels to image primitives in a time-ordered set of training images and to related time-ordered transactions in an associated training transaction log in a combined time-ordered training string of text labels as a function of image types, the assigning comprising labeling a transaction in the associated training transaction log with a transaction label, a training primitive image of a start of a transaction with a start image text label, a training primitive of an entry of a transaction into the log with an entry image text label, and a training primitive of a conclusion of a transaction with an ending image text label;

discover a plurality of positive subset string patterns representing true events from the combined time-ordered training string of text labels that are each repeated in at least two of the positive subset string patterns, start with a start image label, end with an ending image label, and comprise a single transaction primitive label; and define a plurality of negative subset string patterns by removing the single transaction primitive label from each of the plurality of positive subset string patterns.

22. The article of manufacture of claim 21, wherein the computer readable program code instructions, when executed by the computer processor, further cause the computer processor to:

assign text labels to time-ordered image primitives in input image data and to related time-ordered transactions in an associated input transaction log in a combined time-ordered input string of text labels, the assigning comprising labeling a transaction in the associated input transaction log with the transaction label, an input primitive image of a start of a transaction with the start image text label, an input primitive image of an entry of a transaction into the log with the entry image text label, and an input primitive image of a conclusion of a transaction with the ending image text label;

find substrings within the combined time-ordered input string of text labels that match the discovered positive subset string patterns, wherein each positive subset string pattern match contributes a positive vote to each component primitive within said matching input substring;

accumulate the positive votes for each labeled input primitive;

find substrings within the combined time-ordered input string of text labels that match the defined negative subset string patterns, wherein each negative subset string pattern match contributes a negative vote to each component primitive within said matching input substring;

accumulate the negative votes for each labeled input primitive;

classify each of the labeled input primitives into a classified string of text labels as belonging to a true class if their accumulated positive votes exceed their accumulated negative votes, or as belonging to a false class if their accumulated negative votes exceed their accumulated positive votes;

segment continuous stretches of the classified string false labels into false transaction subset strings such that each false transaction subset string has a single entry image primitive; and report the entry images within each of the false transaction subset strings as detected false events.

23. The article of manufacture of claim 22, wherein the computer readable program code instructions, when executed by the computer processor, further cause the computer processor to discover the positive subset string patterns by discovering a plurality of positive subset string patterns representing true events from the combined time-ordered training strings of text labels that each also observe a maximum length limit.

24. The article of manufacture of claim 23, wherein the computer readable program code instructions, when executed by the computer processor, further cause the computer processor to discover the plurality of positive subset string patterns representing true events by using a Teiresias pattern discovery algorithm to discover the plurality of positive subset string patterns representing true events that discovers all repeated unique maximal <L, W> patterns that each have a given maximum number of (W−L) wildcard characters within any of their substrings of a given length (W).

25. The article of manufacture of claim 24, wherein the computer readable program code instructions, when executed by the computer processor, further cause the computer processor to classify each of the labeled input primitives into the classified string of text labels as belonging to the true class or as belonging to the false class by:

determining respective likelihoods of labeled input primitives as being a part of a true or a false event as a function of the context of the primitives and in relative proportion to a total number of positive and negative subset string patterns that match a substring containing the primitive; and assigning the labeled input primitives to one of the true and false classes having a higher determined likelihood.

\* \* \* \* \*